United States Patent [19]

McCracken et al.

[11] Patent Number: 4,961,713
[45] Date of Patent: Oct. 9, 1990

[54] DUAL MOLDED SEALED CONNECTOR WITH INTERNAL GATING

[75] Inventors: Dennis C. McCracken, Winston-Salem, N.C.; Charles R. Malstrom, Lebanon, Pa.; Peter G. Nielsen, King, N.C.

[73] Assignee: AMP Incorporated, Harrisburg, Pa.

[21] Appl. No.: 112,572

[22] Filed: Oct. 22, 1987

[51] Int. Cl.⁵ .................................. H01R 13/40
[52] U.S. Cl. .................................. 439/587; 439/281; 439/589; 29/858
[58] Field of Search ................ 439/281–283, 439/587–589; 29/856–858, 883

[56] References Cited

U.S. PATENT DOCUMENTS

| 4,105,278 | 8/1978 | Braund et al. | 339/103 M |
| 4,311,355 | 1/1982 | Plyler et al. | 339/94 |
| 4,588,242 | 5/1986 | McDowell et al. | 339/59 M |
| 4,664,461 | 5/1987 | Schubert et al. | 339/59 M |
| 4,810,209 | 3/1989 | Punako et al. | 439/589 |

FOREIGN PATENT DOCUMENTS 2068654 8/1981 United Kingdom .
2167249 5/1986 United Kingdom .

Primary Examiner—P. Austin Bradley

[57] ABSTRACT

A dual molded connector and a dual molding process for fabricating a insulative housing having a relatively rigid portion and a relatively more flexible sealing portion is disclosed. The relatively rigid portion is first formed in a mold. Elastomeric material can then be injected after shifting portions of the mold define voids adjacent opposite faces of the molded rigid housing. An internal gate between opposite surfaces of the housing permits sealing material to flow into the void on opposite faces of the housing. Thus, only an external single gate for the injection of sealing material is necessary.

18 Claims, 7 Drawing Sheets

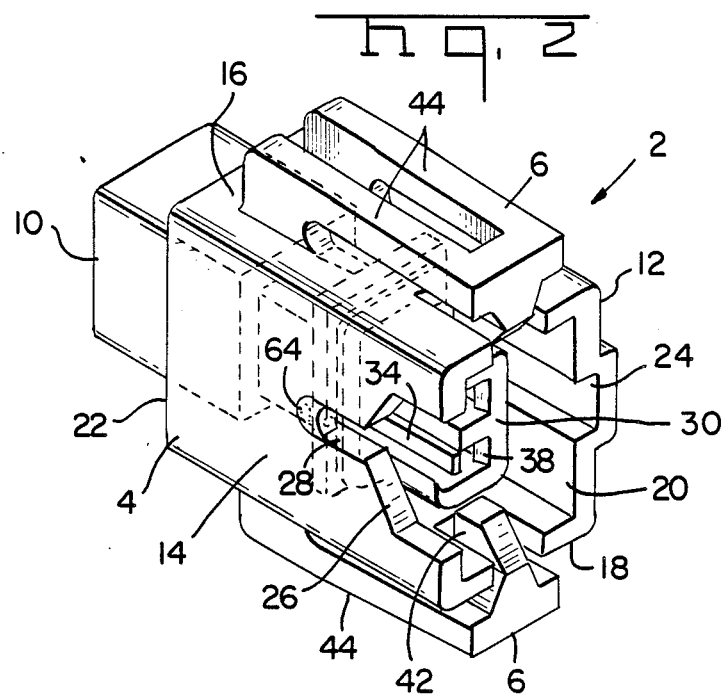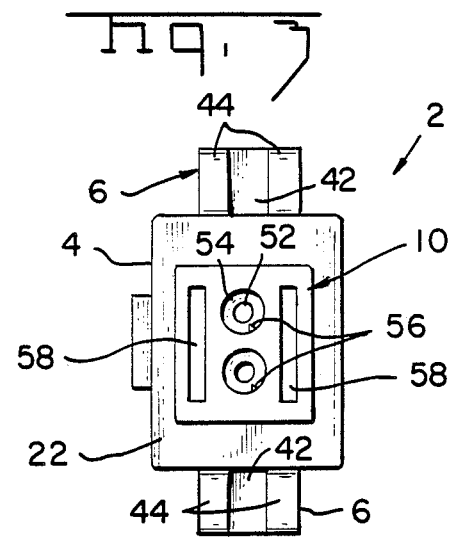

4,961,713

DUAL MOLDED SEALED CONNECTOR WITH INTERNAL GATING

BACKGROUND OF THE INVENTION

1. Field of the Invention

This invention relates to electrical connectors of the type used to form a sealed electrical interconnection and more specifically to electrical connectors having a dual molded insulated housing consisting of a rigid portion and a deformable sealing portion.

2. Description of the Prior Art

U.S. patent application Ser. No. 862,902 filed May 13, 1986, a continuation-in-part of U.S. patent application Ser. No. 453,327 filed Dec. 27, 1982, now abandoned, discloses an electrical connector employing a one-piece molded connector having a flexible sealing material chemically joined to a more rigid material of the type suitable for retaining and separating electrical contact terminals normally used in detachable electrical connectors. The one-piece housing depicted in these two patent applications is formed by a dual molding process in which one material is first injected into a mold, followed by the movement of core pins or sleeves to define one or more adjoining cavities into which the second material can be injected. The disclosure of each of these two pending patent applications is incorporated herein by reference.

Dual molded sealed connectors of the type discussed in that application can be employed in lieu of sealed electrical connectors which employ discrete sealing elements surrounding individual conductors or discrete seals located at the interface between male and female connectors. One example of such a connector employing descrete seals is that shown in U.S. Pat. No. 4,311,355. That connector employs discrete wire seals which are crimped to the insulation by the terminal. An interfacial seal surrounding a plurality of projecting cylindrical towers establishes a seal at the interface between male and female connectors. The assembly of this connector requires that the interfacial seal be assembled on the male connector and each wire seal be crimped to the wire before insertion of the terminals into the connector. Hinged secondary locks must then be closed to provide a secondary lock for the terminals. Numerous assembly operations, generally unsuitable for automated handling, are required when using this connector. Furthermore, this connector is unsuitable for modular keying since there is no provision for selective keying between male and female connectors. All male connectors are identical and all female connectors are identical.

U.S. Pat. No. 4,311,355 discloses a connector in which the terminal and seal are both attached to the wire before inserting the terminals into the rear portion of each housing. Resilient latches are used as retaining features. The connector in U.S. Pat. No. 4,588,242 is also a sealed connector. In this connector a wire is inserted from the rear of the connector housing and terminals are crimped onto the stripped wire on the front of the housing before pulling the crimped terminal back into the housing. Thus this connector does not require that the terminal be inserted through wire seals at the rear of the connector.

SUMMARY OF THE INVENTION

The sealed connector comprising the preferred embodiment of this invention comprises a unitary dual molded housing consisting of a relatively rigid terminal housing and a relatively flexible seal. An interfacial seal is established along the mating face of the electrical connector and a conductor seal is established along an opposite rear face of the terminal housing. An internal seal web joins the interfacial seal with the conductor sealing portion so that seals are established on opposite faces of the terminal housing by at least one continuous sealing member. At least one longitudinal cavity is formed in the relatively rigid terminal housing communicating between opposite faces and the seal web or webs are located within the longitudinal seal cavities.

The sealed connector is fabricated by employing a dual molding process in which the rigid housing in initially formed and core pins and sleeves are moved to define voids on opposite faces of the rigid housing portion along which the interfacial seal and the conductor receiving seal are formed. By defining an internal seal cavity communicating between opposite faces of the relatively rigid housing, only a single gate for injecting the elastomeric sealing material need be provided. When this gate is uncovered and when the elastomeric material is injected, it flows through the internal gate within the rigid housing. In the preferred embodiment of this invention, elastomeric material is injected at the mating face and the conductor sealing portion is on the opposite side of the internal seal cavity from the interfacial seal and the gate.

BRIEF DESCRIPTION OF THE DRAWINGS

FIG. 2 is a view similar to FIG. 1 but showing the unitary seal member in phantom.

FIG. 3 is an orthographic view of the rear face of the housing showing the conductor receiving seal.

FIG. 6 is a cross-sectional view illustrating the manner in which the rigid housing portion of the device would be molded as the first step of the dual molding process.

DETAILED DESCRIPTION OF THE PREFERRED EMBODIMENT

Figure 1:
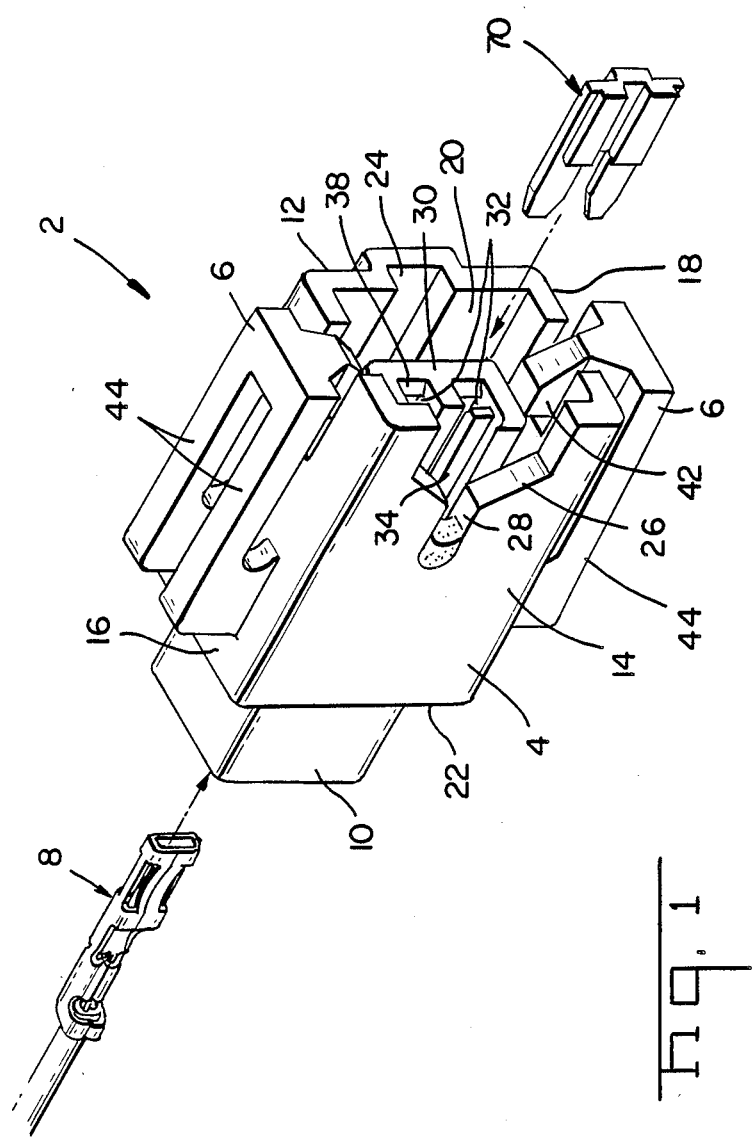
FIG. 1 is a perspective view of the connector showing elements exploded therefrom.
Figure 4:
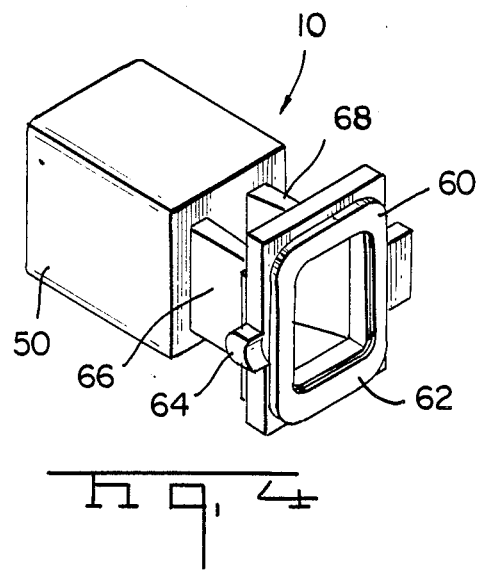
FIG. 4 illustrates the unitary seal element as it wouls appear if the housing were removed, it being understood that the sealing portion of the housing would not, in fact, exist apart from the rigid housing.
Figure 5:
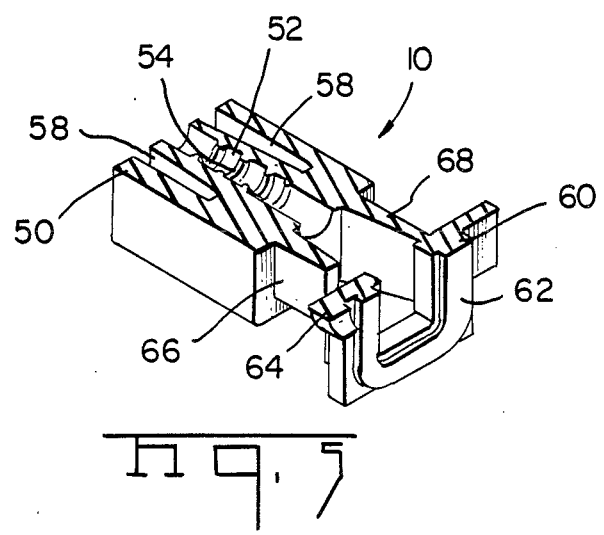
FIG. 5 is a view similar to FIG. 4 shown partially in section to illustrate internal elements of the sealing portion.
Figure 5:
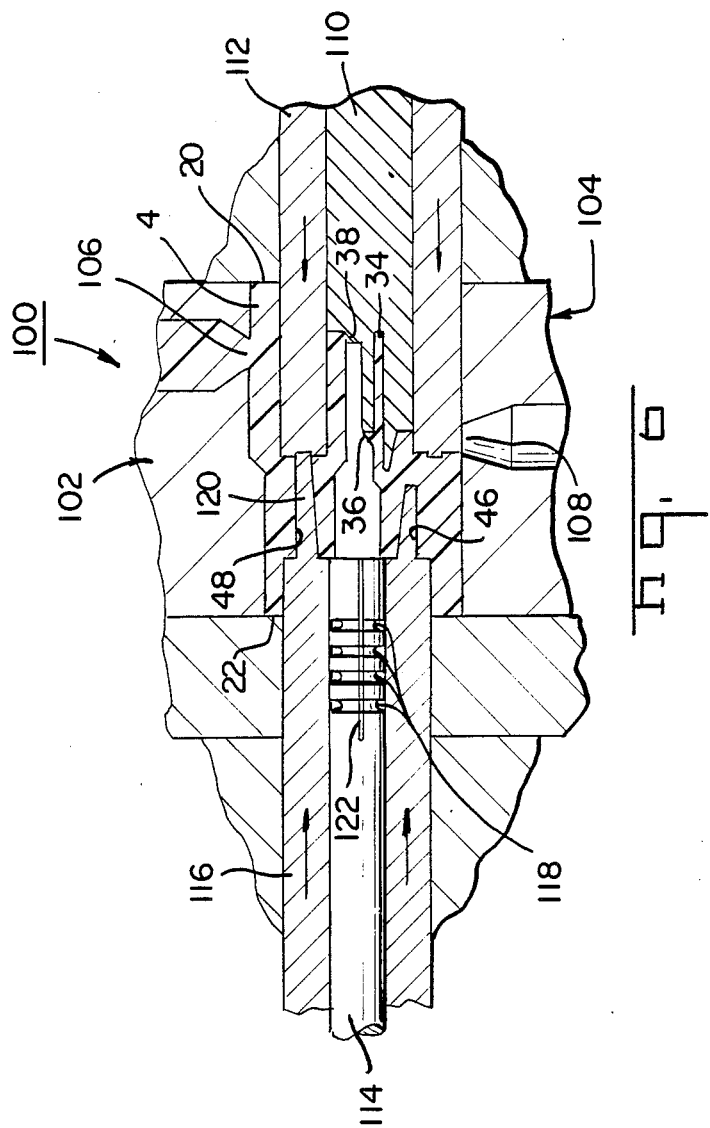

The sealed electrical connector 2 comprising the preferred embodiment of the invention depicted herein is employed to interconnect one or more conductors, such as wires, with terminals in a mating connector or within the header or connecting block on a separate device. The connector 2 comprises an insulative body consisting of a relatively rigid housing 4 and a relatively flexible seal 10. The relatively rigid housing 4 and the seal 10 comprise a unitary member formed by a dual molding process which will be described in further detail. The relatively rigid housing 4 provides a structure for retaining the terminals 8 in position and includes two latches 6 for mechanically securing the connector 2 to a mating connector. The relatively flexible or elastomeric seal 10 is suitable for establishing sealing integrity at the interface between the two connector bodies and for establishing a seal around conductors, such as wires, entering the housing from the opposite face.

The relatively rigid terminal housing 4 is generally prismatic in construction having opposite side faces consisting of back wall 12 and front wall 14. A top wall 16 and a bottom wall 18 extend between the back wall 12 and front wall 14 to define a top face and a bottom face, respectively. The opposite ends of the relatively rigid terminal housing 4 are open defining a mating face 20 and a rear wall face 22 opposite from mating face 20. This opposite face 22 is intermediate the end of the unitary dual molded connector housing which consists of the relatively rigid portion 4 and the relative flexible portion 10. A key slot 24 is defined on the interior of the back wall 12 and serves to establish alignment with a mating connector half, such as that shown in FIG. 10. This key slot is conventional in construction. A funnel shaped cutout 26 is located in the opposite side or front wall 14. This cutout 26 joins a centrally positioned slot 28 which extends back from the mating face 20 of the relatively rigid portion 4. The significance of the slot 28 will be discussed in conjunction with the molding of the seal portion of the insulative body.

The walls 12, 14, 16, 18 define a generally hollow annular mating cavity with a terminal support body 30 extending from the rear wall face 22 toward the mating face 20. Terminal support body 30 is integral with the housing and has a plurality of terminal cavities 32 communicating between the mating face 20 and the opposite or rear face 22. A plurality of fingers 34 extend in cantilever fashion from the rear of the terminal support body 30. A front stop 38 consisting of a protruding shoulder is defined on the terminal cavity wall opposite each of the cantilever fingers 34 and a rear stop 36 is defined at the base of the cantilever fingers 34. Clearance is provided between each cantilever finger and the exterior of the terminal support body so that a latch securing element 70 can be inserted after terminals 8 are positioned within the terminal support body 30. Support is thus provided for the flexible cantilever fingers 34 such that the front and rear stops are held securely against the terminals.

The cavity between the outer walls 12, 14, 16, 18 and the terminal support body 30 is generally annular in configuration and is suitable for receiving a shroud on a complementary connector having terminals centrally disposed therein. The connector 2 is mechanically secured to a mating connector by the outer latches 6, each of which comprises a inwardly projecting latching ear 42 located at the free end of pair of latch arms 44.

In the preferred embodiment of this invention, a seal cavity 48 extends from the annular interfacial cavity 40 through the rear face 22 opposite from the mating face 20. This open seal cavity 48, which has a generally rectangular cross section, extends adjacent to the terminal cavities 32 formed within the terminal support body 30. In the preferred embodiment, cavity 48 extends parallel to terminal cavities 32. A closed seal cavity 46 is located on the opposite side of the terminal support body and extends inwardly from the rear wall face 22. In the preferred embodiment, the closed seal cavity 46 does not, however, communicate with the annular cavity 40 adjacent the mating face 20. The relatively rigid housing 4 may comprise a single piece member which can be injection molded.

The insulative body of connector 2 comprises an elastomeric seal 10 in addition to the housing 4. Terminal support housing 4 and the relatively more flexible seal 10 together comprise elements of a unitary or integral one-piece housing. The seal 10 comprises a conductor sealing portion 50 extending beyond the rear wall face 20 of the relatively rigid terminal support housing 4. The single piece seal 10 also includes an annular interfacial seal 60 located within the annular cavity 40 adjacent the mating face 20 of the housing 4. The conductor seal portion 50 and the interfacial seal portion 60 are joined by at least one intermediate seal web 68 extending through the open seal cavity 48 which communicates between the opposite faces 20, 22.

Seal 10 also has a plurality of wire passages or conductor receiving openings 52 extending between the free end of the seal 10 and the rear of the terminal housing 4. The conductor sealing portion passages 52 are aligned with corresponding terminal cavities 32. A plurality of internal sealing ribs are defined within each conductor sealing passage 52. These sealing ribs 54 extend radially inward and constrict the wire receiving passages 52 to form a sealing fit with a wire inserted therethrough. In the preferred embodiment of this invention, each of the seals are interconnected with a longitudinal integrity rib 56 communicating with the free outermost end of the seal. Slots 58 extending adjacent to the conductor receiving passages 52 are located along opposite sides of the seal in the preferred embodiment of this invention. The rectangular cross section of these slots can be seen in FIG. 3. Slots 58 are aligned with the seal cavities 46, 48 in the terminal support body 4. However, as shown in the cross section of FIG. 10, sealing material is located between the slots 58 and the seal cavities 46, 48.

The interfacial sealing portion 60, located on the front end of the continuous seal 10, is annular in configuration and conforms to the annular cavity 40 in the terminal support housing. An upstanding annular sealing rib 62, which forms the interfacial sealing integrity with a mating conductor, also extends around the annular front face of seal 60. An extension 64 of the seal is located at the root of the cutout slot 28 along the front wall 14 of the terminal support housing. A continuous seal web 68 is located in the open seal cavity 48 and extends between the interfacial seal 60 and the conductor sealing portion 50. A second truncated seal web section 66 extends forwardly from the conductor seal portion 50 in the closed seal cavity 46.

Figure 7:
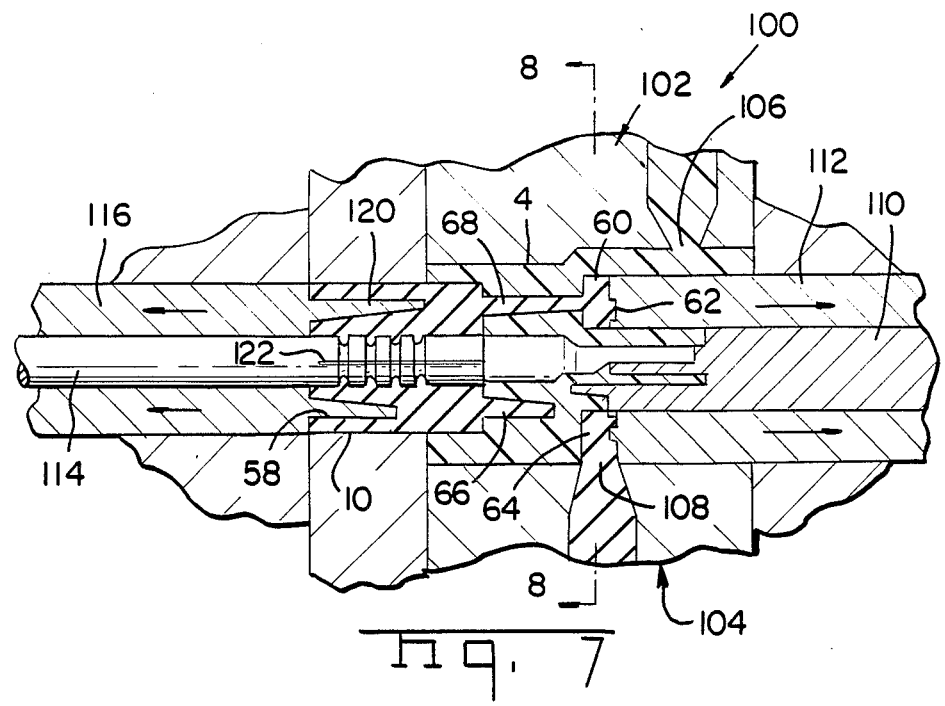
FIG. 7 shows the second step in the dual molding process when the seal is formed.
Figure 8:
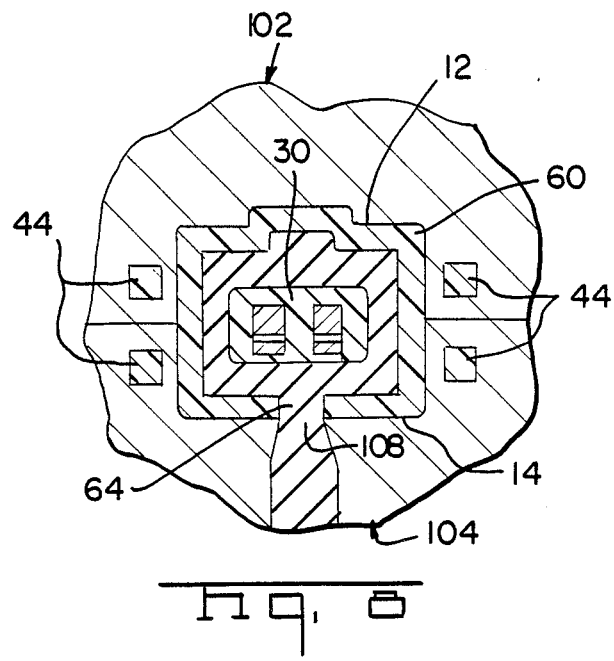
FIG. 8 is a sectional view taken along section lines 8—8 in FIG. 7 and shows the annular configuration of the interfacial seal.
Figure 9:
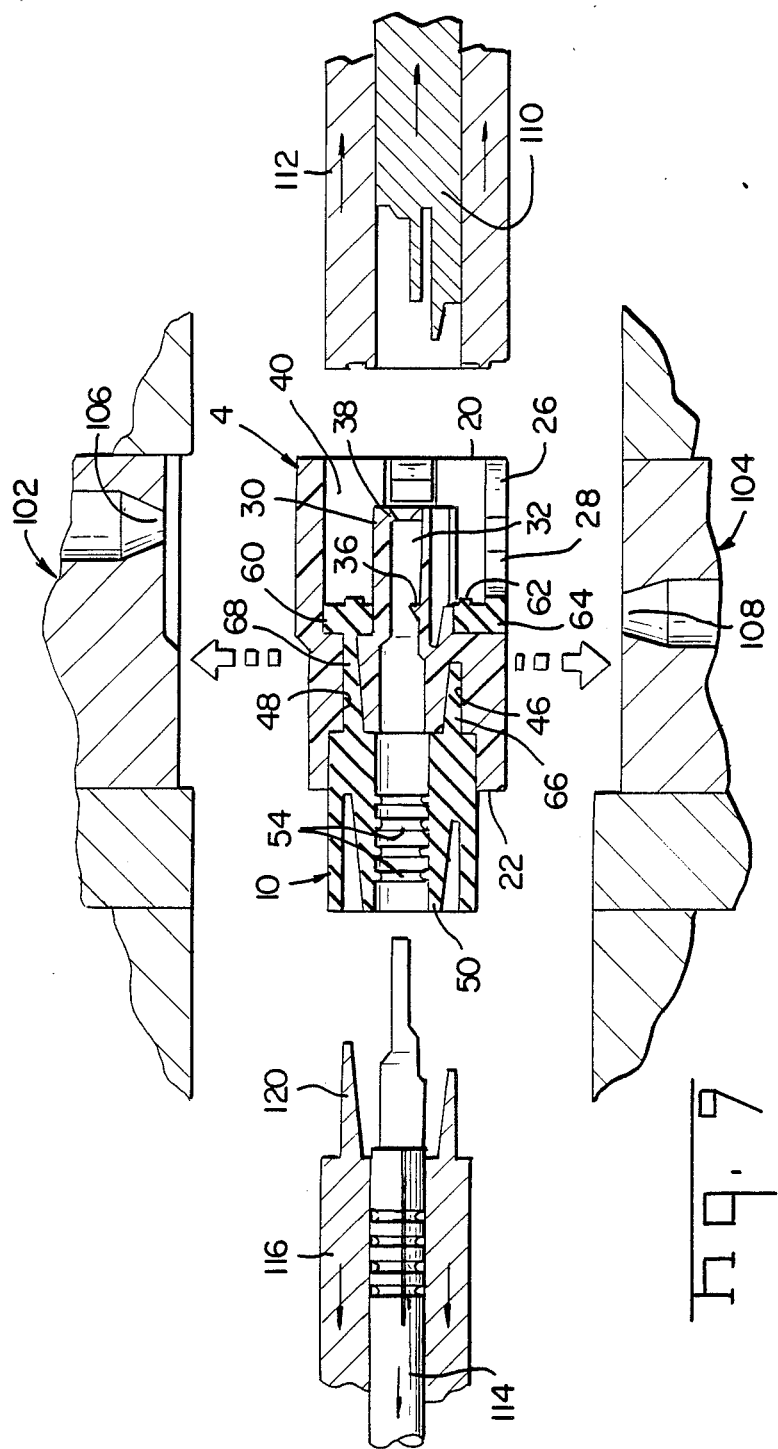
FIG. 9 is a sectional view illustrating final configuration of the housing including both the rigid and flexible portions and demonstrating the elements of the mold which would be employed to fabricate the housing.

FIGS. 6-9 demonstrate a dual molding process by which the dual molded connector housing, having relatively rigid portion 4 and relatively flexible seal 10, can be fabricated. FIGS. 6-10 are illustrative in nature and one skilled in the art could construct a molding apparatus based upon this disclosure and the prior art. The mold 100 consists at least in part of an upper mold half 102 and a lower mold half 104 together with a plurality of core pins and sleeves extending inwardly from the front and rear to define a mold cavity. An upper gate 106 communicates with the mold cavity in FIG. 6. This mold cavity is in the configuration such that the rigid housing 4 can be fabricated by injecting a material, such as polypropylene, through gate 106 into the cavity formed by the upper and lower mold half 102 and 104 and the core pins 110, 114 and core pin sleeves 112, 116, when the respective core pins and core pin sleeves are in the position shown in FIG. 6. Note that core pin sleeve 116, which extends around core pin 114, has a sleeve arm 120 which extends forward into abutment with opposite sleeve 112. Sleeve arm 120 defines internal open seal cavity 48 within the rigid terminal support housing 4. After the rigid support housing 4 has been molded, portions of the mold are shifted to define additional mold cavities or voids adjacent opposite faces of the previously formed rigid housing 4. An elastomeric material, such as Santoprene, can then be injected through a seal material gate 108 located in the lower mold half 104. Movement of sleeve 112 uncovers gate 108 which now can communicate with the cavity 40 formed between the outer walls 12, 14, 16 and 18 of the terminal support housing 4. The elastomeric material can then be injected through gate 108 to form sealing portions adjacent opposite faces 20, 22 of the terminal support housing 4. Note that the gate 108 is aligned with the cutout slot 28 in the rigid terminal support housing. Elastomeric material can thus flow in the annular void between sleeves 112 and the rigid support housing 4, as shown in FIG. 7. This elastomeric material can also flow through the internal seal cavity 48 which serves as a gate between the interfacial seal portion 60 and the conductor sealing portion 50 located adjacent the rear wall face 22 of the terminal support housing 4. Sleeve 116 has been moved rearwardly and the sleeve arm 120 has been moved out of the seal cavity 48. The elastomeric material forms the conductor seal portion 50 after passing through the internal seal cavity 48. The closed seal cavity 46 receives elastomeric material which has initially passed through the open seal cavity 48. The elastomeric material forms around the core pin 114 which has a plurality of grooves 118 for defining the annular sealing ribs 54. A longitudinal groove 122 is formed on the surface of core pin 114 in the vicinity of the grooves 118 to act as a binder for the seal grooves. At least one longitudinal rib 56 will be formed by this longitudinal groove 122.

Figure 10:
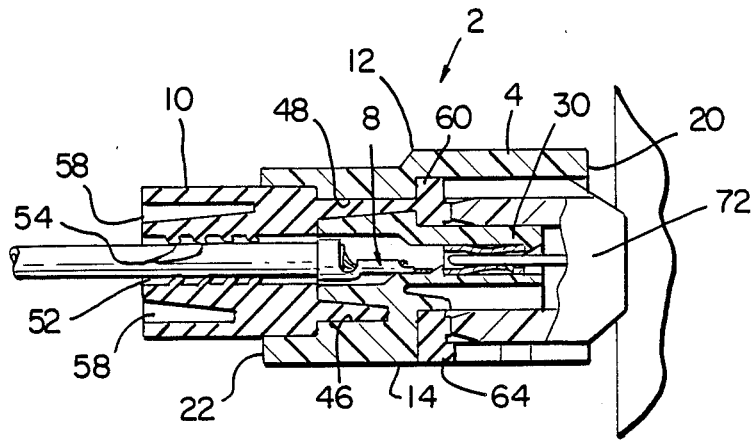
FIG. 10 is a sectional view demonstrating the manner in which the connector would be mated to a corresponding connector or header on a component.

In this manner, a unitary dual molded housing suitable for receiving a terminal 8 crimped on wire, in the fashion shown in FIG. 10, can be constructed. The sealing material is sufficiently resilient to permit insertion of the terminal through the sealing portion. The rear stop 36 on the cantilever finger 34 is deflected out of the path of the terminal 8 during insertion. The terminal comes into engagement with the front stop 38 on the opposite wall of the terminal cavity 32. Subsequently, the securing member 70 can be inserted adjacent the cantilever fingers 34 to secure the terminals against movement in both longitudinal directions. Connector 2 can then be mated with a complementary connector 72, in the manner shown in FIG. 10.

The preferred embodiment of this invention comprises one apparatus and method for employing an internal gate to form seals along opposite surfaces of a housing through the use of a dual molding process. It should be understood that other connectors of general configuration could also be constructed in this manner and, if necessary, a plurality of open ended seal cavities, extending between opposite faces of a more rigid housing member, could also be employed. Therefore, the claims depending hereto are in no way limited to the specific embodiment depicted herein.

We claim:

1. A sealed electrical connector comprising at least one terminal and insulative body including a relatively rigid terminal housing and a relatively flexible seal, the terminal housing including at least one terminal cavity communicating between a mating face and an opposite terminal housing face, a terminal being disposed in each terminal cavity, and at least one internal seal cavity in the terminal housing communicating between the mating face and the opposite terminal housing face, the seal extending through the internal seal cavity in the terminal housing, an interfacial seal portion engagable with a separate mating connector being formed on the mating face and a conductor seal portion being formed adjacent the opposite terminal housing face by a single seal extending through the seal cavity, the insulative body comprising a unitary dual molded member.

2. The sealed electrical connector of claim 1 wherein a portion the seal communicates with one side face of the terminal housing extending between the mating face and the opposite terminal housing face.

3. The sealed electrical connector of claim 2 wherein each seal cavity extends adjacent with the one side face.

4. The sealed electrical connector of claim 1 wherein the conductor seal portion extends beyond the terminal housing with the free end thereof being spaced from the terminal housing, the conductor seal portion having at least one conductor receiving opening communicating with each terminal cavity.

5. The sealed electrical connector of claim 4 wherein a slot extends inwardly from the free end of the conductor seal portion adjacent to at least one conductor receiving opening.

6. The sealed electrical connector of claim 5 wherein the slot is in alignment with and spaced from the seal cavity, the cross-section of the slot conforming to the cross-section of the seal cavity.

7. The sealed electrical connector of claim 6 wherein each conductor receiving opening includes a plurality of constricting radial ribs comprising means for engaging the conductors.

8. A sealed electrical connector comprising at least one terminal and insulative body including a relatively rigid terminal housing and a relatively flexible seal, the terminal housing including at least one terminal cavity communicating between a mating face and an opposite terminal housing face, a terminal being disposed in each terminal cavity, and at least one internal seal cavity in the terminal housing communicating between the mating face and the opposite terminal housing face, the seal extending through the internal seal cavity in the terminal housing, an interfacial seal portion engagable with a separate mating connector being formed on the mating face and a conductor seal being formed on the opposite terminal housing face by a single seal extending through the seal cavity, each seal cavity extending adjacent to the terminal cavity.

9. The sealed connector of claim 8 wherein the conductor seal extends beyond the opposite terminal housing face.

10. The sealed connector of claim 8 wherein the interfacial seal portion is annular.

11. The sealed connector of claim 10 wherein each seal cavity has a rectangular cross-section.

12. A sealed electrical connector comprising at least one terminal and a unitary dual molded insulative body including a relatively rigid terminal housing and relatively flexible seal means, the terminal housing including at least one terminal cavity communicating between a mating face and an opposite terminal housing face, a terminal being disposed in each terminal cavity, the relatively flexible seal means comprising an interfacial seal portion engagable with a separate mating connector being formed on the mating face and a conductor seal portion being formed adjacent the opposite terminal housing face, the conductor seal portion having a passage aligned with each terminal cavity, each passage having a plurality of radial sealing ribs, and at least one integrity rib extending longitudinally along at least a portion of its length between radial sealing ribs and extending to the outermost end of the conductor seal portion, the integrity rib being formed by recess on a core pin defining the seal portion when the conductor seal portion of the insulative body is molded.

13. A method of forming a sealed electrical connector comprising the steps of:
   forming a relatively rigid housing of insulative material in a mold, the mold defining a seal cavity between opposite faces of the housing;
   shifting portions of the mold away from opposite faces of the housing to open the seal cavity between the opposite faces and to define voids in the mold adjacent the opposite faces of the housing;
   exposing a gate in the mold communicating with the seal cavity adjacent one face of the housing;
   injecting an elastomeric material from the gate through the seal cavity while the housing is in the mold to form a single elastomeric seal having sealing surfaces on opposite faces of the housing by a dual molding process.

14. The method of claim 13 wherein the gate is exposed in conjunction with the opening of the voids adjacent opposite faces of the housing and the opening of the seal cavity.

15. The method of claim 13 wherein a first shiftable member is shifted adjacent one face of the housing to open the gate and define a void adjacent the one face of the housing.

16. The method of claim 15 wherein a second shiftable member is shifted to open the seal cavity.

17. The method of claim 16 wherein the second shiftable member is shifted in the opposite direction from the first shiftable member.

18. The method of claim 17 wherein the first and second shiftable members each comprise sleeves.

* * * * *